April 10, 1951 — J. W. GRUSS — 2,548,667
EGG BREAKER
Filed June 9, 1947
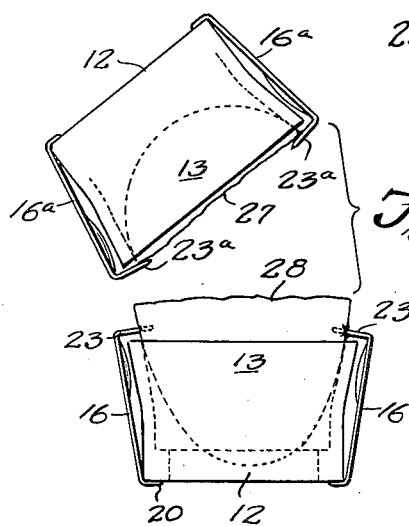
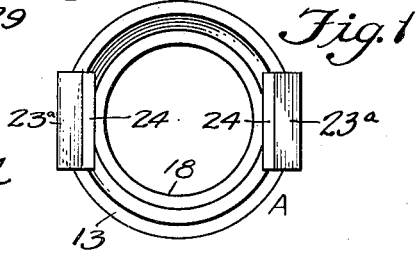
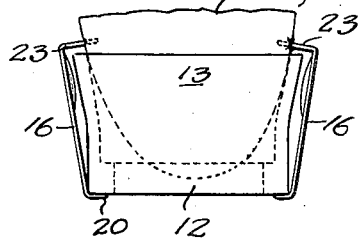
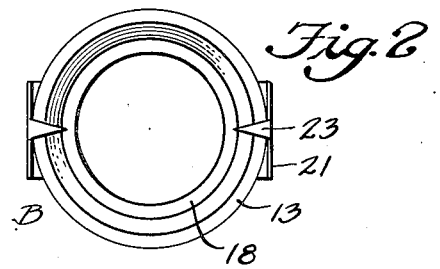
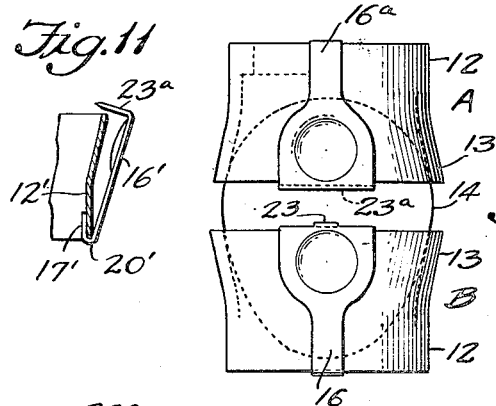
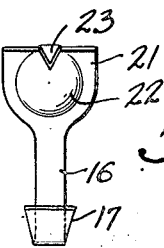
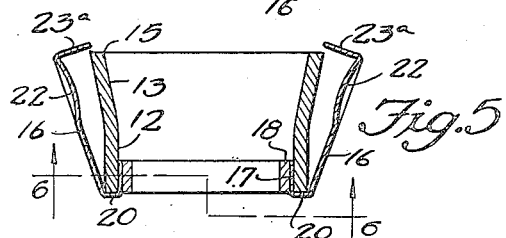
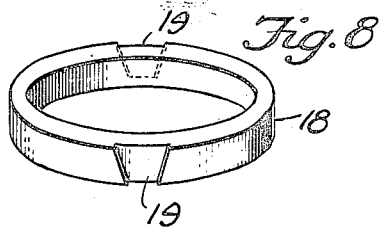
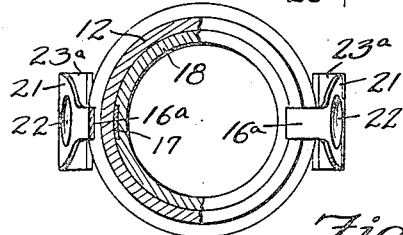
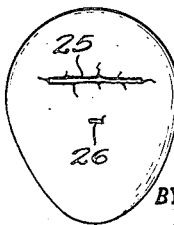
INVENTOR.
BY JACK W. GRUSS
ATTORNEY Patented Apr. 10, 1951

2,548,667

UNITED STATES PATENT OFFICE 2,548,667

EGG BREAKER

Jack W. Gruss, Los Angeles, Calif.

Application June 9, 1947, Serial No. 753,548

4 Claims. (Cl. 146—2)

This invention relates to a device for separating an egg into two sections. It is particularly useful for opening a hot boiled egg. The primary object of the invention is to make it possible to quickly and easily open an egg without the discomfort and possible injury frequently resulting from the direct handling of the egg with the fingers. In general, the invention contemplates the utilization of a pair of members adapted to grip the respective ends of an egg, one of these members having means to sever one end section of the egg from the remainder thereof.

While a number of proposals for devices adapted to engage and sever an egg into two sections have been made, they have not fully solved the problems embodied in a device of this general character. Prior proposals embodying a pair of egg engaging members connected by a hinge have not proven successful for the reason that the hinge interferes with the operation of the device in a satisfactory manner. One of the major objects of the present invention is to provide an egg opening apparatus embodying a pair of egg engaging members which are entirely separate from each other so as to enable them to be manipulated in a manner that will effect substantially clean separation of the two sections by pulling them apart after the separation has been initiated by piercing the shell at diametrically opposite positions, utilizing piercing means forming part of one of the egg engaging members.

Prior proposals have been mainly directed toward piercing the eggshell in a single plane. In some cases only one of the egg engaging members is provided with piercing means. This precludes the possibility of completing the separation of the sections by pulling them apart. My invention contemplates the use of shell piercing means, one of which is adapted to separately engage one section of the shell so as to hold it securely for the pulling-apart stage of operation, and the other of which is adapted to make two diametrically opposed cuts in the shell, of sufficient circumferential extent to provide for completion of the separation, in substantially a common plane, without difficulty, by pulling the sections apart.

Another object of the invention is to provide novel and improved shell puncturing or cutting means adapted to readily produce a pair of linear punctures or cuts in the shell without crushing the shell. In this respect, the invention involves the discovery that a continuous chisel-edge type of cutting edge can be greatly improved upon by employing a serrated cutting edge having a number of relatively fine, sharp pointed teeth.

A further object is to provide an egg separating device embodying a pair of egg engaging and holding members adapted to readily separate an egg into two sections, each of which may then be supported, open side up, in a respective holding member, ready for eating.

A further object of the invention is to provide an egg opening apparatus of extremely simple and inexpensive construction. In this respect, the invention embodies improved features of construction in the attachment of a pair of spring arms to a shell receiving collar or ring.

Other objects will become apparent in the ensuing specification and appended drawings in which:

Fig. 1 is a plan view of one member of my improved egg separating apparatus, equipped with shell severing means;

Fig. 2 is a plan view of the other member of my improved separating means, having shell piercing and holding means;

Fig. 3 is a side view of the apparatus in position for severing an egg;

Fig. 4 is the side view taken at right angles to Fig. 3, showing the separation of the egg;

Fig. 5 is an axial sectional view of one of the severing sections;

Fig. 6 is an end view of the same, shown partially in section as indicated by the line 6—6 of Fig. 5;

Fig. 7 is a detail perspective view of one of the holding arms;

Fig. 8 is a perspective view of the securing ring;

Fig. 9 is a detail end view of a modified form of the severing blade;

Fig. 10 is a view illustrating the action upon an eggshell immediately prior to separation; and Fig. 11 is a fractional sectional view of a modified form of the invention.

As an example of one form in which my invention may be embodied, I have shown in Figs. 1 to 8 inclusive, an egg separating apparatus embodying a severing part A (Fig. 1) and a holding part B (Fig. 2). Each of these parts includes an egg receiving collar 12 having a flared mouth portion 13 adapted to engage the respective end portion of an egg 14 as indicated in Fig. 3. The surface of the egg is engaged along a circular line of engagement by the inner corner 15 of the mouth end of each egg receiving ring. The diameter of the mouth 13 may be the same for each of the parts A and B and is slightly less than the maximum (equatorial) diameter of an egg of a small size. On such an egg, the opposed parts A and B will nearly come together, while on a larger egg, they will be substantially separated as indicated in Fig. 3. Providing the parts A and B as separate members, not connected to each other in any way, makes it possible to thus adjust them to eggs of varying sizes and yet makes it possible to establish snug engagement with the respective end portions of the shell, and to maintain such engagement under pressure. This is an important aspect of the function of the apparatus.

The part B is provided with a pair of shell piercing points 23 carried on the ends of resilient arms 16. The part A is provided with a pair of shell cutting blades 23a formed on the ends of arms 16a. The cutting blades 23a may be provided with chisel edges 24 for cutting through the shell to produce a pair of diametrically opposed incisions 25 each extending approximately a sixth of the circumference of the shell.

Each arm 16, 16a has a dovetail shaped wing 17 which is confined between the collar 12 and a securing ring 18 that is secured in the small end of the collar 12. The dovetailed wings 17 are received in correspondingly shaped notches 19 in the ring 18. Intermediate the wings 17 and the arms 16 is a bend 20 which lies against the end surface of the collar 12. Each arm 16, 16a is anchored by the cooperating engagement of the bend 20 against the end surface of the collar 12 and the engagement of the flared side edges of the wing 17 against the flared side extremities of the notch 19. The notches 19 are located at diametrically opposite points and therefore the two arms 16 are diametrically opposed with reference to the axis of the collar 12.

The arms 16, 16a normally flare away from their respective sides of the collar 12 substantially as shown in Fig. 5.

Piercing points 23 and blades 23a extend inwardly from the extremities of enlarged end portions 21 of the arms 16, clearing the adjacent end of the mouth portion 13 of the collar 12. The enlargements 21 are provided with embossed depressions 22 to receive the finger tips of an operator. The points 23 are adapted to pierce small holes 26 in the shell so as to securely engage one end section of the egg. The holes 26 are sufficiently small so that after having thus pierced the shell with both the cutting blades 23a and the piercing points 23, a subsequent pull between the parts A and B will result in a fairly clean severance of the egg into two sections 27 and 28 along a plane of cleavage determined by the cuts 25. In making this separation, a natural and preferable method is to tilt the parts A and B with reference to each other as indicated in Fig. 4, hinging them about an imaginary hinge axis located adjacent one pair of cutting blades and piercing points. Having the parts A and B unconnected to each other by any hinge mechanism facilitates this separation of the egg into two sections by permitting the hinge axis to be located adjacent the piercing members. To attempt to employ an actual mechanical hinge at this position, would interfere with the operation of the piercing members on this side. On the other hand, to attempt to hinge the two parts A and B about an imaginary hinge (or an actual hinge) positioned quarterly with reference to the piercing members, would considerably increase the difficulty of separating the sections of the egg, and the possibility of securing a clean and well defined plane of cleavage would be considerably diminished.

The modified cutting blade shown in Fig. 9 constitutes an improvement over the cutting blade of the invention in its original concept, as shown in Fig. 1. The chisel edges 24 distribute pressure to the eggshell over a line of definite extent, and have some tendency to crush the shell. I find that by providing a cutting edge which is serrated, being composed of a fairly large number of fine teeth 29, that the cutting blade 23' shown in Fig. 9 will pentrate the shell with a clean cut and a much smaller percentage of crushing of the shell. This is due to the fact that the points of the teeth 29 enter the shell ahead of the rest of the cutting edge and pierce the shell with a large number of minute perforations, none of which causes cracking of the shell. With the shell weakened between this line of perforations, any subsequent cracking will occur directly between the perforations and will be merged in a clean cut in a common plane. An attempt is made to make the points of the teeth 29 as sharp as is practicable in die stamping the cutting blade from the sheet of metal. In this connection, the material of the blade is quite thin, lying in the range of between about 15 and 25 thousandths of an inch.

Returning to the constructional features of the invention, one of the advantages provided by the invention is that it makes it possible to construct the collar 12 from a molded plastic material, in any selected color, and to construct the arms 16, 16a and piercing members from thin sheet metal. While it is of course possible to employ various types of sheet metal, such as, for example, sheet steel, tin, or painted sheet brass coated with an electro-plated coating of a relatively non-tarnishing metal such as chromium, silver, or gold, I prefer to employ simply thin ribbon material of stainless steel. The cobination of the metal finish with the colored plastic finish produces a very attractive appearance in the article. At the same time, I find that this combination of stamped sheet metal fingers and molded plastic collar makes it possible to produce the article at a minimum of expense, even less than that involved in the use of metal tubing as a material for the collar 12. However, the invention does contemplate, as a possible variation in the construction of the invention, the use of metal tubing to form a collar 12' as shown in Fig. 11 and the attachment of the end portions 17' to the inner surface of the collar 12' by welding. In each form of the invention, however, an arm 16, 16a, or 16', as the case may be is secured to the collar by an end portion return bent and secured to the inner surface of the collar. As the result, the bend portion 20 or 20' provides a hinge at maximum distance from the piercing member 23 or 23a. This adds very substantially to the overall flexibility of the arm (especially since a considerable portion of the length of the arm is occupied by the relatively inflexible enlarged portion 21) so as to render the operation of the device more satisfactory and increase the life of the device, since it reduces the degree (angle) of flexing of the arms.

The securing ring 18 is preferably of plastic material, the same as the collar 12, and is secured in place by cementing (softening its outer surface or the inner surface of the collar 12 with a solvent for the plastic material) and then forcing the ring into place. The notches 19 are sufficiently shallow so that the wings 17 will be engaged under some pressure between the ring 18 and the shell 12, thus tightly wedging the wings 17 in place and securing the arms 16 tightly, minus any "wobble."

In the use of the apparatus, one of the parts A, B is placed upon a table or other supporting surface and the egg is inserted therein. The other part is then placed over the exposed end of the egg, bringing the parts to the position shown in Fig. 4. The operator then grasps the arms 16 between the thumb and a finger of one hand (nesting the tips of the thumb and finger in the depressions 22) and similarly grasps the arms 16a between the thumb and a finger of the other hand. He then presses the mouth portions of the collars firmly into engagement with the egg. He then presses both sets of arms inwardly so as to cause the blades 23a and points 23 to pierce the shell, while continuing to press the mouth portions 13 against the shell to hold the egg tightly for the piercing operation, and to prevent it from slipping under the pressure of the piercing members. The arms are pressed inwardly until they engage the mouth portions 13 of the respective collars 12. This engagement determines adequate piercing and cutting of the shell by the members 23 and 23a respectively and the parts A and B are then pulled apart, preferably by tipping them as indicated in Fig. 4. The parts A and B may then be employed to retain hold upon each egg section while a spoon is used to remove the contents into an egg dish. Alternatively, each of the parts A and B may be set upon a plate and utilized as a holder from which the two sections of egg may be eaten. Throughout these operations, the fingers of the operator need not contact the shell, and burning is thereby completely avoided.

I claim:

1. Egg opening apparatus comprising an annular collar, open at both ends, said collar having at one end a mouth adapted to receive a respective end portion of an egg and to engage the shell thereof with a circular line of contact in the equatorial zone thereof, a securing ring mounted within the other end of said collar, and a pair of spring arms each having an end portion secured between the inner surface of said collar and said securing ring, each of said spring arms being bent around said other end of the collar and thence extending toward the mouth end of the collar, and having egg piercing means adjacent said mouth end.

2. Egg opening apparatus comprising a collar having at one end an egg receiving mouth and at its other end a securing ring mounted within the other end of said collar, said securing ring being provided with a pair of diametrically opposed dove-tail shaped slots, and a pair of resilient arms, each having end portions of dove-tail shape snugly fitted into said slots and secured between the inner surface of said collar and said securing ring, each of said arms being bent around the end of said collar remote from said mouth and thence extending toward said mouth and terminating in free ends adjacent said mouth, said free ends having shell piercing means.

3. Egg opening apparatus comprising a pair of separate annular collars, each having at one end a circular egg engaging edge defining an egg receiving mouth slightly less in diameter than the diameter of the equator of a hen's egg of less than average size, said collars being unconnected so that they may be separately manipulated into positions pressed against the respective end portions of an egg with said mouths receiving said end portions and engaging them with circular lines of contact short of said equator, and a pair of resilient arms for each of said collars, each attached at one end to a respective collar at the end of the collar remote from said mouth, extending, externally of the collar, in diametrically opposed relation toward and slightly beyond said one end having a free end adjacent said mouth, and shell piercing jaws on each of said free ends, extending inwardly adjacent said one end of each collar, and adapted, when said arms are pressed toward each other, to extend past said one end into the area of the mouth, one pair of said jaws each consisting in a narrow pointed holding jaw for piercingly engaging one end portion of an egg shell to hold the same firmly against movement, and the other pair of jaws comprising cutting jaws having circumferentially elongated cutting edges for piercing a portion of the shell of substantial circumferential extent in the other end portion thereof whereby said one pair of jaws will function to hold the egg while said other pair of jaws operates to separate said other end portion of the shell from the body of the shell along said line of fracture.

4. Egg opening apparatus comprising a pair of separate annular collars, each having at one end a circular egg engaging edge defining an egg receiving mouth slightly less in diameter than the diameter of the equator of a hen's egg of less than average size, said collars being unconnected so that they may be separately manipulated into positions pressed against the respective end portions of an egg with said mouths receiving said end portions of the egg shell and engaging them with circular lines of contact short of said equator, and a pair of resilient arms for each of said collars, each arm attached at one end to a respective collar at the end of the collar remote from said mouth, extending, externally of the collar, in diametrically opposed relation toward said mouth and terminating in free ends, each of said free ends being provided with shell piercing means extending generally radially toward each other past said egg engaging edge of the respective collar, one pair of jaws each consisting in a narrow pointed holding jaw for piercingly engaging one end portion of an egg shell to hold the same firmly against movement, and the other pair of jaws having piercing means of substantial circumferential width, disposed in a common plane parallel to said mouth, for piercing said shell along substantial portions of a generally circular line of fracture to be established in the other end portion of the shell, whereby one pair of jaws will function to hold the egg while the other pair of jaws operates to separate said other end portion of the shell from the body of the shell along said line of fracture.

JACK W. GRUSS.

REFERENCES CITED

The following references are of record in the file of this patent:

UNITED STATES PATENTS

| Number | Name | Date |
| --- | --- | --- |
| 319,954 | Butterfield | June 16, 1885 |
| 691,389 | Kendrick | Jan. 21, 1902 |
| 782,039 | Merrifield et al. | Feb. 7, 1905 |
| 900,908 | Bancroft | Oct. 13, 1908 |
| 1,030,324 | Pender | June 25, 1912 |